US012790500B2

(12) United States Patent
Valdisera et al.

(10) Patent No.: US 12,790,500 B2
(45) Date of Patent: Nov. 10, 2026

(54) ELECTROCHROMIC GELS AND DEVICES CONTAINING THEM

(71) Applicant: PPG Industries Ohio, Inc., Cleveland, OH (US)

(72) Inventors: Kevin Mark Valdisera, Pittsburgh, PA (US); Nicolas Benjamin Duarte, Allison Park, PA (US); David Leonardo Gonzalez Arellano, Allison Park, PA (US); Dhawal Rajendra Thakare, Jeannette, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 120 days.

(21) Appl. No.: 18/706,796

(22) PCT Filed: Nov. 2, 2022

(86) PCT No.: PCT/US2022/079098
§ 371 (c)(1),
(2) Date: May 2, 2024

(87) PCT Pub. No.: WO2023/081667
PCT Pub. Date: May 11, 2023

(65) Prior Publication Data

US 2025/0043135 A1 Feb. 6, 2025

Related U.S. Application Data

(60) Provisional application No. 63/276,009, filed on Nov. 5, 2021.

(51) Int. Cl.
*C09D 5/29* (2006.01)
*C08K 5/3432* (2006.01)
(Continued)

(52) U.S. Cl.
CPC ................ *C09D 5/29* (2013.01); *C09D 5/24* (2013.01); *C09D 7/20* (2018.01); *C09D 7/63* (2018.01);
(Continued)

(58) Field of Classification Search
CPC ... C09D 5/29; C09D 7/20; C09D 7/63; C09D 5/42; C09D 127/16; G02F 1/15165;
(Continued)

(56) References Cited

U.S. PATENT DOCUMENTS 4,750,817 A 6/1988 Sammells
4,807,977 A 2/1989 Sammells
(Continued)

FOREIGN PATENT DOCUMENTS

CA 1339921 C 9/1998
CN 112666771 A 4/2021
(Continued)

OTHER PUBLICATIONS

Moon, Hong Chul et al., Multicolored, Low-Power, Flexible Electrochromic Devices Based on Ion Gels, ACS Applied Materials & Interfaces, 2016, 9, 6252-6260.
(Continued)

*Primary Examiner* — Sharrief I Broome

(57) ABSTRACT

Electrochromic gels that are useful in making an electrochemical cell. Application of an electrical potential or voltage across the electrochemical cell causes an oxidation-reduction reaction to take place in the electrochemical gel that results in the electrochemical cell reducing visible light transmittance therethrough. The electrochemical gels include 20 to 99 wt. % of a polar solvent, 0.5 to 25 wt. % of a rheology modifying agent, and 0.5 to 20 wt. % of an
(Continued)

electrochromic material. The rheology modifying agent is soluble in the polar solvent and forms a gel at ambient conditions when dissolved.

19 Claims, 10 Drawing Sheets

(51) Int. Cl.

| | |
|---|---|
| ***C08K 5/3465*** | (2006.01) |
| ***C09D 5/24*** | (2006.01) |
| ***C09D 7/20*** | (2018.01) |
| ***C09D 7/63*** | (2018.01) |
| ***C09D 127/16*** | (2006.01) |
| ***C09K 9/02*** | (2006.01) |
| ***G02F 1/1341*** | (2006.01) |
| ***G02F 1/1514*** | (2019.01) |
| ***G02F 1/1516*** | (2019.01) |
| ***G02F 1/155*** | (2006.01) |

(52) U.S. Cl.
CPC .............. *C09D 127/16* (2013.01); *C09K 9/02* (2013.01); *G02F 1/1341* (2013.01); *G02F 1/15165* (2019.01); *G02F 1/155* (2013.01); *C08K 5/3432* (2013.01); *C08K 5/3465* (2013.01); *C09K 2211/1018* (2013.01); *G02F 2001/15145* (2019.01)

(58) Field of Classification Search
CPC ................... G02F 1/1341; G02F 1/155; G02F 2001/15145; C08K 5/3432; C08K 5/3465; C09K 2211/1018
USPC .......................................................... 359/265
See application file for complete search history.

(56) References Cited

U.S. PATENT DOCUMENTS

| | | | |
|---|---|---|---|
| 5,068,062 | A | 11/1991 | Inata et al. |
| 5,185,074 | A | 2/1993 | Yokoyama et al. |
| 5,189,549 | A | 2/1993 | Leventis et al. |
| 5,413,739 | A | 5/1995 | Coleman |
| 5,604,626 | A | 2/1997 | Teowee et al. |
| 5,708,123 | A | 1/1998 | Johannsen et al. |
| 5,729,379 | A | 3/1998 | Allemand et al. |
| 6,003,511 | A | 12/1999 | Fukunaga et al. |
| 6,178,034 | B1 | 1/2001 | Allemand et al. |
| 6,747,779 | B1 | 6/2004 | Morin et al. |
| 8,559,093 | B2 | 10/2013 | Varaprasad et al. |
| 2002/0012156 | A1 * | 1/2002 | Varaprasad ....... B32B 17/10697 359/275 |
| 2004/0021928 | A1 | 2/2004 | Warner et al. |
| 2005/0002081 | A1 | 1/2005 | Beteille et al. |
| 2005/0213184 | A1 | 9/2005 | France |
| 2006/0018001 | A1 | 1/2006 | Kojima et al. |
| 2006/0132885 | A1 | 6/2006 | Pichot et al. |
| 2006/0139724 | A1 | 6/2006 | Liant et al. |
| 2006/0203322 | A1 | 9/2006 | Radmard et al. |
| 2006/0204866 | A1 | 9/2006 | Hirano et al. |
| 2006/0268385 | A1 | 11/2006 | Guarr et al. |
| 2007/0020442 | A1 | 1/2007 | Giron et al. |
| 2007/0153357 | A1 | 7/2007 | Noh et al. |
| 2008/0186564 | A1 | 8/2008 | Noh et al. |
| 2008/0190759 | A1 | 8/2008 | Valentin et al. |
| 2008/0304132 | A1 | 12/2008 | Jung et al. |
| 2008/0316573 | A1 | 12/2008 | Shim et al. |
| 2009/0067031 | A1 * | 3/2009 | Piroux .................. G02F 1/1524 204/192.1 |
| 2009/0181203 | A1 * | 7/2009 | Valentin ................ E04F 13/145 428/38 |
| 2010/0091353 | A1 | 4/2010 | Kokeguchi et al. |
| 2011/0216389 | A1 | 9/2011 | Piroux et al. |
| 2011/0222138 | A1 | 9/2011 | Piroux et al. |
| 2012/0019890 | A1 | 1/2012 | Yeh et al. |
| 2012/0044561 | A1 | 2/2012 | Yeh et al. |
| 2012/0050838 | A1 | 3/2012 | Hirno et al. |
| 2012/0081773 | A1 | 4/2012 | Yeh et al. |
| 2012/0120476 | A1 | 5/2012 | Yeh et al. |
| 2012/0154891 | A1 | 6/2012 | Yeh et al. |
| 2013/0235323 | A1 | 9/2013 | Sotzing et al. |
| 2013/0293825 | A1 | 11/2013 | Trajkovska et al. |
| 2016/0070150 | A1 * | 3/2016 | Lam ........................ G02F 1/163 359/241 |
| 2016/0266460 | A1 | 9/2016 | Kloeppner et al. |
| 2018/0155321 | A1 | 6/2018 | Kim et al. |
| 2018/0252975 | A1 | 9/2018 | Endoh et al. |
| 2019/0086757 | A1 | 3/2019 | Mei et al. |
| 2019/0122598 | A1 | 4/2019 | Duarte et al. |
| 2019/0384134 | A1 | 12/2019 | Park et al. |
| 2020/0183243 | A1 | 6/2020 | Kiefer et al. |

FOREIGN PATENT DOCUMENTS

| | | | |
|---|---|---|---|
| EP | 0612826 | A1 | 8/1994 |
| EP | 0682284 | A3 | 1/1996 |
| JP | 2002-341387 | A | 11/2002 |
| JP | 2011-008210 | A | 1/2011 |
| JP | 2018-514799 | A | 6/2018 |
| JP | 2020-509434 | A | 3/2020 |
| KR | 10-2017-0134472 | A | 12/2017 |
| KR | 10-2019-0114941 | A | 10/2019 |
| WO | 1999035312 | A1 | 7/1999 |
| WO | 2016/145120 | A1 | 9/2016 |

OTHER PUBLICATIONS

Shan Zhao et al., A novel bis(dihydroxypropyl) viologen-based all-in-one electrochromic device with high cycling stability and coloration efficiency, Electrochimica Acta, 2019, vol. 298, pp. 533-540, ISSN 0013-4686, https://doi.org/10.1016/j.electacta.2018.12.135.

Yolanda Alesanco et al., All-in-One Gel-Based Electrochromic Devices: Strengths and Recent Developments, Materials 11, No. 3: 414. https://doi.org/10.3390/ma11030414.

Office Action received for Korean Patent Application No. 10-2024-7014473, mailed on Oct. 31, 2024, 18 pages (9 pages of English Translation and 9 pages of Original Document).

Yoshiaki Yasuda et al: "4,4',4"-Tris (Stearoylamino) Triphenylamine as a Novel Material for Functional Molecular Gels", Advanced Materials, VCH Publishers, DE, vol. 8, No. 9, Sep. 1, 1996, pp. 740/741, XP000621870.

International Search Report and Written Opinion received for PCT Application Serial No. PCT/US2022/079098 dated Jan. 27, 2023, 9 pages.

* cited by examiner

ELECTROCHROMIC GELS AND DEVICES CONTAINING THEM

CROSS-REFERENCE TO RELATED APPLICATIONS

This application is a U.S. national stage filing under 35 U.S.C. § 371 of International Application No. PCT/US2022/079098, filed on Nov. 2, 2022, which claims the benefit of priority of U.S. Provisional Application 63/276,009 filed Nov. 5, 2021, under 35 U.S.C. 119, titled "Electrochromic Gels and Devices Containing Them", both of which is are incorporated herein by reference.

FIELD

This disclosure generally relates to electrochromic gels, optical devices containing them and methods of making them.

BACKGROUND

Electrochromic materials, typically placed in a cell for use, have demonstrated utility in displays, transparent devices, and smart systems for the automotive, aerospace, eyewear, and building industries.

SUMMARY

This disclosure describes electrochromic gels that include 20 to 99 wt. % of a polar solvent, 0.5 to 25 wt. % of a rheology modifying agent, and 0.5 to 20 wt. % of an electrochromic material. The rheology modifying agent is soluble in the polar solvent and forms a thermoreversible gel at ambient conditions when dissolved.

DETAILED DESCRIPTION

Figure 1:
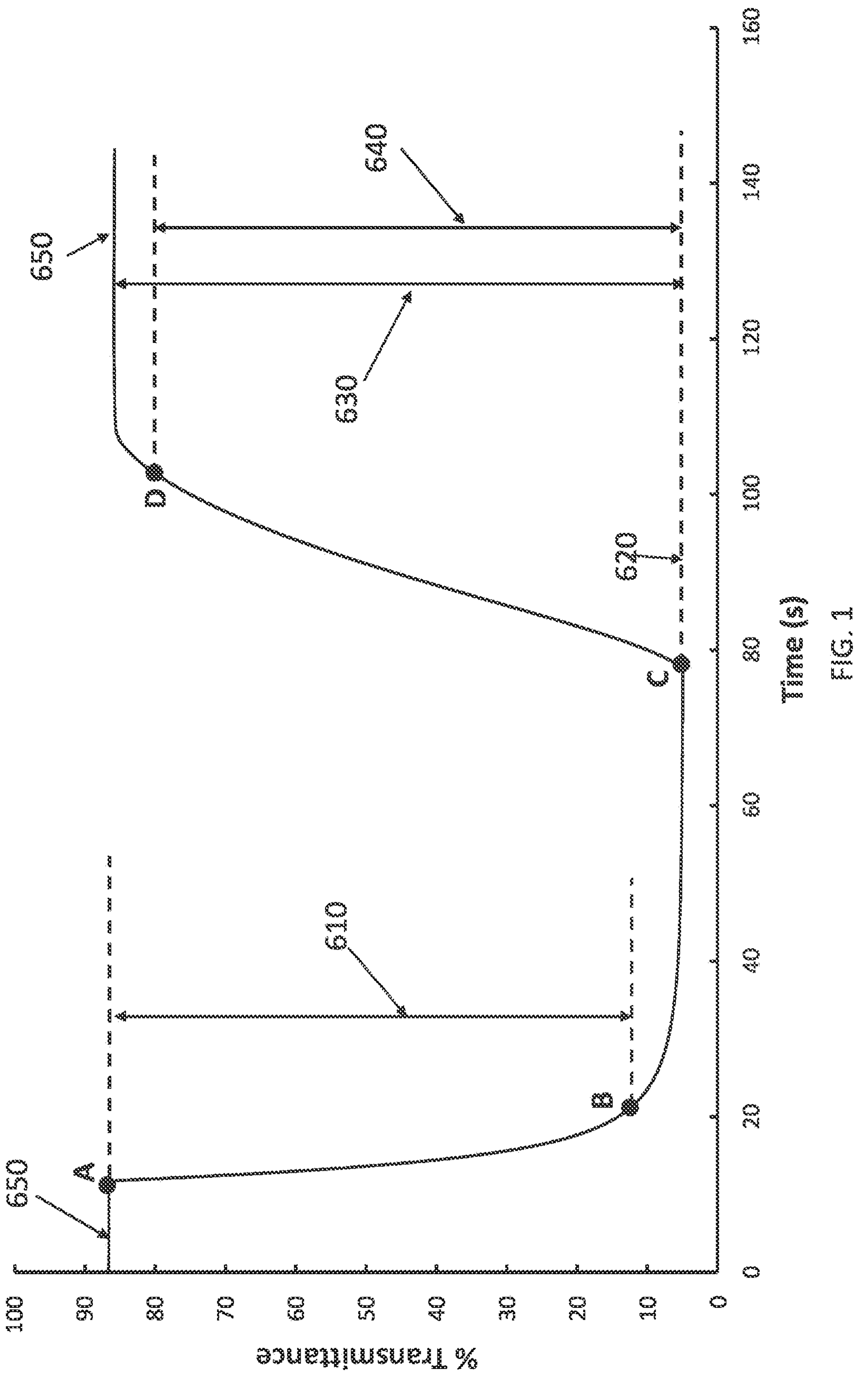
FIG. 1 is a nonlimiting depiction of transmittance vs. time during operation of electrochromic cells according to the disclosure.

Unless otherwise indicated, conditions of temperature and pressure are ambient temperature (22° C.), a relative humidity of 30%, and standard pressure of 101.3 kPa (1 atm).

Unless otherwise indicated, any term containing parentheses refers, alternatively, to the whole term as if parentheses were present and the term without them, and combinations of each alternative. Thus, as used herein the term, "(meth)acrylate" and like terms is intended to include acrylates, methacrylates and their mixtures.

It is to be understood that this disclosure may assume various alternative variations and step sequences, except where expressly specified to the contrary. Accordingly, unless indicated to the contrary, the numerical parameters set forth in the following specification and attached claims are approximations that can vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

All ranges are inclusive and combinable. For example, the term "a range of from 0.06 to 0.25 wt. %, or from 0.06 to 0.08 wt. %" would include each of from 0.06 to 0.25 wt. %, from 0.06 to 0.08 wt. %, and from 0.08 to 0.25 wt. %. Further, when ranges are given, any endpoints of those ranges and/or numbers recited within those ranges can be combined within the scope of the present disclosure.

As used herein, unless otherwise expressly specified, all numbers such as those expressing values, ranges, amounts or percentages can be read as if prefaced by the word "about", even if the term does not expressly appear. Unless otherwise stated, plural encompasses singular and vice versa. As used herein, the term "including" and like terms means "including but not limited to". Similarly, as used herein, the terms "on", "applied on/over", "formed on/over", "deposited on/over", "overlay" and "provided on/over" mean formed, overlay, deposited, or provided on but not necessarily in contact with the surface. For example, a coating layer "formed over" a substrate does not preclude the presence of one or more other coating layers of the same or different composition located between the formed coating layer and the substrate.

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the disclosure.

As used herein, the articles "a", "an", and "the" include plural references unless expressly and unequivocally limited to one referent.

As used herein, the term "anode" refers to an electrode through which a conventional current enters into an electrical device.

As used herein, the term "block copolymer" refers to copolymers where the repeat units exist only in long sequences, or blocks, of the same type.

As used herein, the term "cathode" refers to an electrode through which a conventional current leaves an electrical device.

As used herein, the term "coating layer" refers to the result of applying one or more coating compositions on a substrate in one or more applications of such one or more coating compositions.

As used herein the term "compound" refers to a substance formed by the union of two or more elements, components, ingredients, or parts and includes, without limitation, molecules and macromolecules (for example polymers and oligomers) formed by the union of two or more elements, components, ingredients, or parts.

As used herein, the terms "conjugated polymers" and "conjugated copolymers" refer to organic macromolecules that are characterized by a backbone chain of alternating double- and single-bonds. Their overlapping p-orbitals create a system of delocalized $\pi$-electrons, which can result in useful optical and electronic properties.

As used here, the term "cut and stick" refers to a method of applying a coating material by forming a free standing coating film and laminating the film to a substrate, as a nonlimiting example, pressing a gel between two electrodes that are a fixed distance apart from each other.

As used here, the term "draw down" refers to a method and associated equipment used to apply a coating to a substrate by drawing a coating materials across the substrate using a wire or metering rod at a fixed distance (coating layer thickness) from the substrate.

As used herein, the term "electric potential" refers to the amount of work needed to move a unit charge from a reference point to a specific point against an electric field.

As used herein, the term "electrode" refers to a conductor through which electricity enters or leaves an object or substance.

As used herein, the term "electrochromic material" refers to materials that are able to vary their coloration and/or transparency to radiation, in a reversible manner, when they are subjected to an electric field.

As used herein the term "electromagnetic radiation" refers to the waves of the electromagnetic field, propagating through space, carrying electromagnetic radiant energy. Nonlimiting examples include radio waves, microwaves, infrared light, visible light, ultraviolet light, X-rays, and gamma rays.

As used herein the term "fully cleared state" refers to an electrochromic cell or system with a percent transmittance (% T) above the minimum transmittance value by least at 85% of the optical contrast in the absence of applied voltage.

As used herein the term "fully darkened state" refers an electrochromic cell or system with a percent transmittance (% T) below the maximum transmittance value by least at 85% of the optical contrast at a given voltage.

As used herein, the term "gel" refers to a nonfluid polymer network that is expanded throughout its whole volume by a fluid. Such polymer networks may include covalently crosslinked polymer chains, or a polymer network formed through the physical aggregation of polymer chains caused by hydrogen bonds, crystallization, helix formation, complexation, etc., that results in regions of local order acting as the network junction points.

As used herein, the term "lamination" refers to producing a composite system by using two or more materials stacked in layers.

As used herein, the term "layer" refers to a thickness of some material laid on, spread, or applied over a surface of another material.

As used herein, the term "metal mesh" refers to fine woven wire that acts as transparent conductive electrodes and, as nonlimiting examples, can be constructed of Au, Ag, Al, Fe, Co, Ni and/or Cu.

As used herein, the terms "luminance" or "photopic transmittance" refer to transmittance over the visible region (380 nm to 780 nm) that is normalized with respect to the illumination source and weighted to the sensitivity of the human eye.

As used herein, the term "maximum transmittance" refers to transmittance exhibited by a device at a specific wavelength or range of wavelengths, in the absence of any voltage for at least 24 h.

As used herein, the term "minimum transmittance" refers to transmittance exhibited by a device at a specific wavelength or range of wavelengths, upon the application of voltage, which can either be direct voltage or variable voltage having a specific waveform, for at least 24 h.

As used herein, the term "optically clear" refers to 30% or higher transmittance in the visible region of the electromagnetic spectrum (380-720 nm).

As used herein, the term "optical contrast" refers to the difference between the maximum transmittance and the minimum transmittance of a device at a specific wavelength or range of wavelengths.

As used herein, the term "optical substrate" refers to a substrate made of materials with good light transmittance, in at least some spectral ranges, exhibiting little absorption and scattering of light. Nonlimiting examples include glass, such as fused silica and fused quartz, which can include alkali-aluminosilicate glass such as that used as touch screens for hand-held electronic devices.

As used herein, the terms "oxidation-reduction reaction" and "redox" refer to reactions that are characterized by the actual or formal transfer of electrons between chemical species, often with one species undergoing oxidation while another species undergoes reduction.

As used herein, the term "phenazine and its derivatives" includes substituted and unsubstituted dibenzo annulated pyrazine ($C_{12}H_8N_2$-phenazine) and ($C_{12}R^2{}_{10}N_2$) where each $R^2$ independently represents H, OH, $NR^3{}_2$ (where each $R^3$ independently represents H and $C_1$ to $C_3$ alkyl), $C_1$ to $C_{12}$ linear or branched alkyl containing up to one less than the number of substituent carbons of hydroxyl, thiol, halogen, siloxane, amine, ketone, carboxyl, amide, and ether groups, aromatic groups containing 6 to 18 carbon atoms and, optionally, one or more hetero atoms including O, N and S and, optionally $C_1$ to $C_{12}$ linear or branched alkyl containing up to one less than the number of substituent carbons of hydroxyl, thiol, halogen siloxane, amine, ketone, carboxyl, amide, and/or ether groups. Nonlimiting examples of phenazine derivative include dimethyl phenazine and diisopropyl phenazine.

As used herein, the term "polar solvent" refers to chemical compounds having a dipole moment greater than 1.25 containing (protic) or not containing (aprotic) one or more hydrogen atoms attached to an electronegative atom and capable of dissolving a rheology modifying agent.

As used herein, the term "polymer" includes homopolymers (formed from one monomer) and copolymers and block copolymers that are formed from two or more different monomer reactants or that include two or more distinct repeat units. Further, the term "polymer" includes prepolymers, and oligomers.

As used herein, the term "power source" refers to a source of electrical potential, voltage or other electric current provider electrically connected to two or more electrodes, nonlimiting examples include, batteries, transformers that convert conventional AC or DC current to an acceptable level, photovoltaic mediums, capacitors, super capacitors, and combinations thereof.

As used herein, the terms "pseudoplastic" and "shear thinning" refer to a solution, suspension or other mixture where it takes on non-Newtonian behavior such that viscosity decreases under increasing shear stress.

Unless otherwise noted, all rheology data (nonlimiting examples including complex viscosity, loss modulus, etc.) reported herein were measured using an Anton Paar MCR 302 rheometer with a cone and plate configuration having a 25 mm diameter and 1 degree cone angle equipped with RheoCompass software.

As used herein, the term "rheology modifying agent" refers to a composition, soluble in a polar solvent, that forms a thermoreversible gel at ambient conditions after dissolution.

As used herein, the term "screen printing" refers to a method of applying a coating material to a substrate by stretching a thin mesh over a substrate and the coating material is rolled over the screen to apply a coating layer to the substrate.

As used herein, the term "short circuit" refers to an electrical circuit having an unintended connection point resulting in accidental diversion of the current.

For purposes of the present disclosure, a material is considered "soluble" if a minimum of 0.5% by weight of the material is capable of dissolving in the specified solvent As used herein, the term "spin coating" refers to a method of applying a coating material to a substrate by placing a coating material on the substrate, which is either spinning at low speed or not spinning at all and rotating the substrate a speed sufficient to spread the coating material across the substrate by centrifugal force.

As used herein, the term "spray coating" refers to a coating processes that uses a spray of droplets to deposit a coating material onto a substrate.

As used herein, the term "thermoreversible gel" refers to a gel formed through physical aggregation of polymer chains, in which regions of local order can change in response to changes in temperature.

As used herein, the term "transparent" refers to allowing light to pass through a material so that objects behind can be distinctly seen. As nonlimiting examples, the term "substantially transparent" seeing a surface at least partially visible to the naked eye when viewed through the material and the term "fully transparent" refers seeing to a surface as completely visible to the naked eye when viewed through the material.

As used herein, the term "transmitted radiation" refers to radiation that is passed through at least a portion of an object.

As used herein, the term "viologen and its derivatives" includes organic compounds with the formulas $(C_5H_4N)_2$ (viologen) and $(C_5H_4NR)_2^{n+}$, where R represents $C_1$ to $C_{12}$ linear or branched alkyl containing up to one less than the number of substituent carbons of hydroxyl, thiol, halogen, siloxane, amine, ketone, carboxyl, amide, and ether groups, aromatic groups containing 6 to 18 carbon atoms and, optionally, one or more hetero atoms including O, N and S and, optionally $C_1$ to $C_{12}$ linear or branched alkyl containing up to one less than the number of substituent carbons of hydroxyl, thiol, halogen siloxane, amine, ketone, carboxyl, amide, and/or ether groups. Nonlimiting examples of viologen derivatives include N,N'-diheptyl viologen (heptyl viologen) and N,N'-diphenyl viologen with nonlimiting examples of counterions tetrafluoro borate and phosphorous tetrafluoride.

As used herein, the term "voltage" refers to the difference in electric potential between two points.

This disclosure is directed to electrochromic gels that include a polar solvent, a rheology modifying agent, and an electrochromic material. The rheology modifying agent is soluble in the polar solvent and forms a thermoreversible gel at ambient conditions when dissolved.

The polar solvent can be included in the electrochromic gel at a level of at least 20 wt. %, such as 25 wt. % and 30 wt. % and can be up to 99 wt. %, such as 95 wt. %, 90 wt. %, 85 wt. % and 80 wt. %, based on the total weight of the electrochromic gel. The amount of polar solvent in the electrochromic gel can be from 20 to 99 wt. %, such as from 20 to 90 wt. %, 20 to 80 wt. %, 25 to 99 wt. %, 25 to 90 wt. %, 25 to 80 wt. %, 30 to 99 wt. %, 30 to 90 wt. %, and 30 to 80 wt. %. The amount of polar solvent included in the electrochromic gel can be any value or range between any of the values recited above.

The polar solvent can include protic or aprotic polar solvents and mixtures thereof.

Nonlimiting examples of aprotic solvents that can be used in the electrochromic gel include $C_1$ to $C_6$ alkyl carbonates; $C_1$ to $C_6$ alkyl phosphates; ketones of $C_1$ to $C_{12}$ linear or branched alkanes, nonlimiting examples including acetone and methyl isobutyl ketone; methyl ethyl ketone, dimethyl sulfoxide and dimethyl formamide.

Nonlimiting examples of protic solvents that can be used in the electrochromic gel include $C_1$ to $C_6$ alcohols, water, and formamide.

The rheology modifying agent can be included in the electrochromic gel at a level of at least 0.5 wt. %, such as 1 wt. % and 2 wt. % and can be up to 25 wt. %, such as 20 wt. %, 15 wt. %, and 10 wt. %, based on the total weight of the electrochromic gel. The amount of rheology modifying agent in the electrochromic gel can be from 0.5 to 25 wt. %, such as from 0.5 to 20 wt. %, 0.5 to 10 wt. %, 1 to 25 wt. %, 1 to 20 wt. %, 1 to 10 wt. %, 2 to 25 wt. %, 2 to 20 wt. %, and 2 to 10 wt. %. The amount of rheology modifying agent included in the electrochromic gel can be any value or range between any of the values recited above. If the amount of rheology modifying agent is too low, the electrochromic gel may not form a gel that can be applied as a coating layer as described herein. If the amount of rheology modifying agent is too high, the resulting electrochromic gel may have rheological properties that do not readily allow the electrochromic gel to be applied as a coating layer as described herein.

The rheology modifying agent can be any material that provides the electrochromic gel with the rheological properties described herein when combined with a polar solvent, nonlimiting examples including pseudoplastic behavior and thermoreversible gel properties. Nonlimiting examples of rheology modifying agents that can be used in the electrochromic gel include poly(vinylidene fluoride), poly(vinylidene fluoride-co-hexafluoropropylene), poly(dimethylsiloxane), poly(vinyl chloride), poly(vinyl alcohol), poly(methyl (meth)acrylate), poly(ethylene oxide), poly(propylene carbonate) and combinations thereof.

As a nonlimiting example, the thermoreversible gel can be a gel at up to 25° C., such as up to 30° C., or up to 35° C. or up to 40° C. As a further nonlimiting example, the thermoreversible gel can be a fluid at 120° C., such as greater than 100° C., greater than 90° C. or greater than 80° C.

The electrochromic material can be included in the electrochromic gel at a level of at least 0.5 wt. %, such as 1 wt. % and 2 wt. % and can be up to 20 wt. %, such 15 wt. %, and 10 wt. %, based on the total weight of the electrochromic gel. The amount of rheology modifying agent in the electrochromic gel can be from 0.5 to 20 wt. %, such as from 0.5 to 15 wt. %, 0.5 to 10 wt. %, 1 to 20 wt. %, 1 to 15 wt. %, 1 to 10 wt. %, 2 to 20 wt. %, 2 to 15 wt. %, and 2 to 10 wt. %. The amount of electrochromic material included in the electrochromic gel can be any value or range between any of the values recited above. If the amount of electrochromic material is too low or too high, the electrochromic gel may not provide the electrochromic properties as described herein.

The electrochromic material can include a cathodic electrochromic agent and an anodic electrochromic agent, acting as an oxidation-reduction pair. The oxidation-reduction reaction can result in the electrochromic gel turning dark or colored. The color can depend on the electrochromic agent used. As nonlimiting examples, the cathodic electrochromic agent can include viologen and its derivatives and the anodic electrochromic agent can be phenazine and its derivatives.

Nonlimiting examples of cathodic electrochromic materials include viologen and its derivatives (nonlimiting examples including dialkyl viologens and diaryl viologens). Nonlimiting examples of anodic electrochromic materials include phenazine and its derivatives (nonlimiting examples including dialkyl phenazines and diaryl phenazines), N,N,N',N'-tetramethyl-p-phenylenediamine, 10-methylphenothiazine, 10-ethylphenothiazine, and tetrathiafulvalene.

As a nonlimiting example, the electrochromic gel can have a complex viscosity at 25° C. of at least 5,000 mPa-s, such as at least 10,000 mPa-s, 20,000 mPa-s and 30,000 mPa-s and can be up to 3,000,000 mPa-s, such as 2,500,000 mPa-s, 2,000,000 mPa-s and 1,500,000 mPa-s. The complex viscosity of the electrochromic gel can be from 5,000 mPa-s to 3,000,000 mPa-s, such as from 5,000 mPa-s to 2,500,000 mPa-s, 5,000 mPa-s to 1,500,000 mPa-s, 10,000 mPa-s to 3,000,000 mPa-s, 10,000 mPa-s to 2,500,000 mPa-s, 10,000 mPa-s to 1,500,000 mPa-s, 20,000 mPa-s to 3,000,000 mPa-s, 20,000 mPa-s to 2,500,000 mPa-s, and 20,000 mPa-s to 1,500,000 mPa-s. The complex viscosity can be measured using an Anton Paar MCR 302 rheometer with a cone and plate configuration having a 25 mm diameter and 1 degree cone angle equipped with RheoCompass software.

As a nonlimiting example, the electrochromic gel can have a complex viscosity at 90° C. of at least 500 mPa-s, such as at least 750 mPa-s, and 1,000 mPa-s and can be up to 3,000 mPa-s, such as 2,500 mPa-s and 2,000 mPa-s at 90° C. The complex viscosity of the electrochromic gel can be from 500 mPa-s to 3,000 mPa-s, such as from 500 mPa-s to 2,500 mPa-s, 500 mPa-s to 2,000 mPa-s, 750 mPa-s to 3,000 mPa-s, 750 mPa-s to 2,500 mPa-s, 750 mPa-s to 2,000 mPa-s, 500 mPa-s to 3,000 mPa-s, 500 mPa-s to 2,500 mPa-s, and 500 mPa-s to 2,000 mPa-s. The complex viscosity can be measured using an Anton Paar MCR 302 rheometer with a cone and plate configuration having a 25 mm diameter and 1 degree cone angle equipped with RheoCompass software.

As a nonlimiting example, the electrochromic gel can have a viscosity-shear rate slope of from −1 to −10 mPa-$s^2$, such as −1.5 to −7 mPa-$s^2$ and −2 to −5 mPa-$s^2$ at 25° C. measured using an Anton Paar MCR 302 rheometer with a cone and plate configuration having a 25 mm diameter and 1 degree cone angle equipped with RheoCompass software at a shear rate of from 0.01 to 1 $s^{-1}$.

As a nonlimiting example, the electrochromic gel can have a viscosity-shear rate slope of from −0.5 to 0.5 mPa-$s^2$, such as −0.4 to 0.4 mPa-$s^2$ and −0.3 to 0.3 mPa-$s^2$ at 90° C. measured using an Anton Paar MCR 302 rheometer with a cone and plate configuration having a 25 mm diameter and 1 degree cone angle equipped with RheoCompass software at a shear rate of from 1 to 100 $s^{-1}$.

As a nonlimiting example, the electrochromic gel can have a complex viscosity-temperature slope of from 40 mPa-s/° C. to 250 mPa-s/° C., such as 50 mPa-s/° C. to 200 mPa-s/° C. and 60 mPa-s/° C. to 150 mPa-s/° C. measured using an Anton Paar MCR 302 rheometer with a cone and plate configuration having a 25 mm diameter and 1 degree cone angle equipped with RheoCompass software decreasing temperature from 90° C. to 25° C. over six minutes at an oscillation shear strain of 1% and a constant frequency of 10 rad/s.

As a nonlimiting example, the electrochromic gel can have a complex viscosity-temperature slope of from −40,000 mPa-s/° C. to −250,000 mPa-s/° C., such as −50,000 mPa-s/° C. to −200,000 mPa-s/° C. and −60,000 mPa-s/° C. to 150,000 mPa-s/° C. measured using an Anton Paar MCR 302 rheometer with a cone and plate configuration having a 25 mm diameter and 1 degree cone angle equipped with RheoCompass software increasing temperature from 25° C. to 90° C. over six minutes at an oscillation shear strain of 1% and a constant frequency of 10 rad/s.

The electrochromic gel can optionally include additives such as electrolyte salts, antioxidants, ultraviolet (UV) stabilizers, oxygen scavengers, light blocking additives or combinations of any two or more thereof. The additives can be added in concentrations of 0.05 wt. % to 20 wt. %, or up to the solubility limit of each of the additives in the electrochromic gel.

As a nonlimiting example, electrolyte salts can contain a combination of a cationic part (positively charged) and an anionic part (negatively charged). Examples of cationic parts include, but are not limited to, lithium, tetraalkylammonium (alkyl is any group having formula $C_nH_{2n+1}$ where n is a integer), triakylammonium, triphenylphosphonium, N-alkylpyridinium and its derivatives, N,N'-dialkylimidazolium and its derivatives, tetraalkylphosphonium, N,N-dialkylpyrrolidinium and its derivatives. Examples of anionic parts include, but are not limited to, tetrafluoroborate, triflate, triflamide, hexafluorophosphate, chloride, bromide, iodide, fluoride, dicyanamide, carboxylate, phosphinate, dialkylphosphate, tosylate, alkylsulfate, acetate, bis(trifluoromethanesulfonyl)imide, trifluoromethanesulfonate, hydrogen sulphate.

Antioxidants and oxygen scavengers include, but are not limited to, butylated hydroxytoluene (BHT), 4-tert-butylcatechol, pyrogallol, 6-tert-butyl-2,4-xylenol, 2-butanone oxime, hydroquinone, ascorbic acid, diethylhydroxylamine, catechin, ellagic acid, curcumin, vitamin E, sodium ascorbate, propyl gallate, butylhydroxyanisol (BHA), sterically hindered phenolic antioxidants (including derivatives thereof).

UV stabilizers can include classes of materials commonly referred to as UV absorbers and hindered amine light stabilizers (HALS). Examples of UV stabilizers include, but are not limited to, oxybenzone and its derivatives, benzotriazoles and its derivatives, triazines and its derivatives, benzophenones and its derivatives, TINUVIN series of UV stabilizers trademarked and sold by BASF SE of Ludwigshafen, Germany. Non-limiting commercial examples of UV stabilizers include, but not limited to, TINUVIN P, TINUVIN 1130, TINUVIN 99-2. TINUVIN 384-2, TINUVIN 400, TINUVIN 479, TINUVIN 477, TINUVIN Carboprotect, TINUVIN 123, TINUVIN 144, TINUVIN 292, TINUVIN 151, TINUVIN 152, TINUVIN 213, TINUVIN 234, TINUVIN 326, TINUVIN 327, TINUVIN 328, TINUVIN 571, TINUVIN 622, TINUVIN 765, TINUVIN 770, an IRGANOX compound (e.g., IRGANOX 245, IRGANOX 1010, IRGANOX 1035, IRGANOX 1076, IRGANOX 1098, IRGANOX 1135, and/or IRGANOX 5057; each available from BASF SE of Ludwigshafen, Germany), Unitex OB (available from Angene Chemica of Hong Kong), a CHIMASSORB compound (e.g., CHIMASSORB 81, CHIMASSORB 944 LD, and/or CHIMASSORB 2020 FLD; each available from BASF SE of Ludwigshafen, Germany), a BLS compound (e.g., BLS 99-2, BLS 119, BLS 123, BLS 234, BLS 292, BLS 531, BLS 0113-3, BLS 1130, BLS 1326, BLS 1328, BLS 1710, BLS 2908, BLS 3035, BLS 3039, and/or BLS 5411; each available from Mayzo Inc. of Suwanee, Ga, USA), and/or CYASORB CYNERGY SOLUTIONS L143-50X Stabilizer (available from Cytec Industries, Inc. of Woodland Park, NJ, USA).

Nonlimiting examples of light blocking additives (blocks light of a particular wavelength) can include classes of chemical compounds including, but not limited to, inorganic nanoparticles (e.g., metal oxides and metal nanoparticles), organic nanoparticles, organometallic nanoparticles, benzotriazoles (including derivatives thereof), triazines (including derivatives thereof), triazoles (including derivatives thereof), hindered amine light stabilizers (HALS, including derivatives thereof), benzophenones (including derivatives thereof), silanes having amine functionality (including derivatives thereof), sterically hindered, phenolic antioxidants (including derivatives thereof), silanes having isocyanate functionality (including derivatives thereof), cyanoacrylates, tetraphenylporphyrins, tetramesitylporphyrins, perylenes, oxalanilides, phthalocyanines, chlorophylls (including derivatives thereof), bilirubin (including derivatives thereof), primary antioxidants, pigments dyes (e.g., organometallic dyes), and combinations thereof.

Nonlimiting examples of the dye include bilirubin; chlorophyll a, diethyl ether; chlorophyll a, methanol; chlorophyll b; deprotonated tetraphenylporphyrin; hematin; magnesium octaethylporphyrin; magnesium octaethylporphyrin (MgOEP); magnesium phthalocyanine (MgPc), PrOH; magnesium phthalocyanine (MgPc), pyridine; magnesium tetramesitylporphyrin (MgTMP); magnesium tetraphenylporphyrin (MgTPP); octaethylporphyrin; phthalocyanine (Pc); porphin; tetra-t-butylazaporphine; tetra-t-butylnaphthalocyanine; tetrakis(2,6-dichlorphenyl) porphyrin; tetrakis (oaminophenyl) porphyrin; tetramesitylporphyrin (TMP); tetraphenylporphyrin (TPP); vitamin B12; zinc octaethylporphyrin (ZnOEP); zinc phthalocyanine (ZnPc), pyridine; zinc tetramesitylporphyrin (ZnTMP); zinc tetramesitylporphyrin radical cation; zinc tetraphenylporphyrin (ZnTPP); perylene; oxanilide; derivatives thereof; and combinations thereof.

As nonlimiting examples, the inorganic nanoparticles can include a metal oxide chosen from, but not limited to, cerium oxide (e.g., Ceo2), zinc oxide (e.g., ZnO), zirconium dioxide (ZrO2), titanium dioxide (TiO2), stannic oxide/tin oxide (SnO2), antimony pentoxide (Sb2O5), silicon oxide (SiO2) and the like.

Non-limiting commercial examples of the dye (e.g., the organometallic dye) include Cu(II) Meso-tetra (4-carboxyphenyl) porphine (e.g., High Performance Optics Dye Generation 4D, available from High Performance Optics of Roanoke, Va., or any other suitable High Performance Optics Dye, including Generation 4A, 4B, and/or 4C).

Nonlimiting examples of the light blocking additive may include TINUVIN 477 (which includes a red-shifted Tris-Resorcinol-Triazine Chromophore), compounds available from High Performance Optics of Roanoke, Va. (e.g., Generation 4B dye and/or Generation 4D dye), TINUVIN 292, and/or TINUVIN 1130.

The electrochromic gel can be made by combining the electrochromic material and a portion of the polar solvent by mixing under ambient conditions to form an electrochromic material solution, combining the rheology modifying agent and a portion of the polar solvent by mixing, as a nonlimiting example, at a temperature of from 30° C. to 120° C. to form a Theology modifying agent solution, and combining the electrochromic material solution and the rheology modifying agent solution and allowing the combined solution to cool to ambient conditions to form the electrochromic gel.

The electrochromic gel can be used to make an electrochromic cell according to this disclosure. The method includes providing a first optical substrate, applying a first conductor over at least a portion of the first optical substrate and optionally over at least a portion of a second optical substrate, applying a second conductor over at least a portion of the first optical substrate such that the second conductor is not in direct contact with the first conductor, applying a coating layer that includes the electrochromic gel described above over at least a portion of the first optical substrate, and optionally over at least a portion of the second optical substrate, and in contact with the first conductor and the second conductor, optionally applying the second optical substrate over the first conductor, the second conductor and electrochromic gel and providing a power source connected to the first conductor and the second conductor.

When the electrochromic gel is used to coat a first optical substrate, optionally a gel that includes the rheology modifying agent and optionally the electrochromic materials can be applied to the second optical substrate. Optionally, when the electrochromic gel is used to coat a first optical substrate, a surfactant, a solvent, plasma treatments and/or other surface treatments (as a nonlimiting example silanes) can be applied to the second optical substrate to change the surface energy and/or provide better wetting.

Either of the first conductor and the second conductor can act as a cathode and the other electrode can act as an anode (and can switch when polarity is reversed).

The first and second optical substrates can be optically clear substrates. When optically clear substrates are used, the first optically clear substrate and the second optically clear substrate independently include glass, flexible polymeric materials and rigid polymeric materials, nonlimiting examples include poly (methyl methacrylate), polycarbonate, polyethylene terephthalate, poly (allyl diglycol carbonate), polyurea, polyurethane, poly-thiourea, and/or polythiourethane.

The first conductor and second conductor can be transparent conductors.

The first conductor and the second conductor can independently be in the form of a mesh, multiple lines or other patterns as long as the pattern is sufficiently conductive to provide the required electrochromic activity.

The first conductor and the second conductor can include indium tin oxide, partially octadecyltrichlorsilane covered indium tin oxide, metal mesh (as a nonlimiting example, metalized silver mesh), and conductive nanomaterials including silver nanowires, gold nanowires, carbon nanotubes, and graphene, fluorine-doped tin oxide, aluminum doped zinc oxide (AZO), and conductive polymers, nonlimiting examples including poly(3,4-ethylenedioxythiophene), the ionomer mixture of poly(3,4-ethylenedioxythiophene) and polystyrene sulfonate, polyacetylene, polyphenylene vinylene; polypyrrole, polythiophene, polyaniline and/or polyphenylene sulfide. Optionally, any transparent conductor can be used, as long as it is sufficiently conductive to provide the required electrochromic activity.

The electrochromic cell can include, and/or be powered by, an external power source that can provide power of sufficient voltage and current. As a nonlimiting example, a controller can be configured to activate when an electric potential or voltage is required to be applied to the electrodes. As nonlimiting examples, one or more inputs such as optical sensors, temperature sensors, or a switch can be in communication with the controller. The controller can receive input information from the one or more inputs and can be configured to determine whether the power source used to provide an electric potential or voltage to the should be provided. As nonlimiting examples, the power source can be a battery, a transformer converting conventional AC or DC current to an acceptable level, a photovoltaic medium, a capacitor, a super capacitor, and combinations thereof. The external power supply can be electrically coupled to the controller and one or more inputs and can be configured to provide electric potential or voltage to the electrodes. More than one supply can be implemented to supply power to the electrochromic cell. The power source, controller, sensors, switches and/or electrodes can be connected by wires or other means known in the art.

The coating layer that includes the electrochromic gel described herein can be applied using methods known in the art. Nonlimiting examples of methods that can be used to apply the coating layer that includes the electrochromic gel include draw down, screen printing, spin coating, spray application, cut and stick, extrusion, casting, ink jet, gravure, and roll to roll.

Depending on the composition of the electrochromic gel the coating layer can behave more like a solid or a fluid. The coating layer that includes the electrochromic gel method can have a film thickness of at least 0.1 mil, such as 0.5 mil and 1 mil and up to 12 mil, such as 10 mil, 8 mil and 5 mil. The coating layer can have a thickness of from 0.1 to 12 mil, such as 0.1 to 10 mil, 0.1 to 8 mil, 0.1 to 5 mil, 0.5 to 12 mil, 0.5 to 10 mil, 0.5 to 8 mil, 0.5 to 5 mil, 1 to 12 mil, 1 to 10 mil, 1 to 8 mil, and 1 to 5 mil. The thickness of the coating layer that includes the electrochromic gel can be any thickness or range between any thicknesses recited above.

The electrochromic cells described herein can include a sealant to seal the perimeter of the cell between the first and second optical substrates. Nonlimiting examples of sealant materials can include those based on epoxy, polyolefin (such as polypropylene, polyethylene, copolymers and mixtures thereof), silicones, polyesters, polyamides and/or polyurethane resins.

The visible light transmittance through the electrochromic cell in the clear state (no electrochromic color) can be from 50% to 99%, such as from 55% to 95%, 60% to 90% and 65% to 90%.

The power supply in the electrochromic cell can be used to apply an electrical potential or voltage between the cathode and anode. The voltage applied to the electrochromic cell; direct current, alternating current or variable voltage; can be from 0.05 to 50 V, such as 0.1 to 50 V. 0.1 to 40 V, 0.1 to 30 V, 0.5 to 20 V, and 1 to 10 V. The application of an electrical potential or voltage to the electrochromic cell causes an oxidation-reduction reaction to take place in the electrochromic gel resulting in the electrochromic cell becoming darker (dark state) and reducing the visible light transmittance through the electrochromic cell.

The visible light transmittance through the electrochromic cell in the dark state can be from 0.00001 to 50%, such as from 0.0001 to 50%, 0.001 to 50%, 0.1% to 50%, 0.1% to 35%, 0.1% to 25%, 0.1% to 10%, 0.5% to 4%, 1% to 3.5% and 0.1% to 3%, measured according to ASTM E972 at visible spectrum wavelengths between 380 nm and 780 nm.

The amount of haze in the electrochromic cell in the clear state can be from 0.01% to 10%, such as from 0.05% to 1%, 0.5% to 4%, 1% to 3.5% and 0.1% to 3%, measured using a Hunter UltraScan PRO.

FIG. 1 is a nonlimiting representative plot of transmittance versus time during the operation of electrochromic cells according to this disclosure. In FIG. 1, the cell is initially in its maximum transmittance (as denoted by 650) state and may achieve minimum transmittance (as denoted by 620) on application of a specified voltage. The difference between the maximum and minimum transmittance is the optical contrast (as denoted by 630). As a voltage is applied at A at maximum transmittance state, which can either be direct voltage or pulsed voltage having a specific frequency and amplitude, transmittance of the system decreases. The time to reduce transmittance by 85% of the optical contrast (maximum transmittance 650 minus 85% of optical contrast 630, shown as 610), denoted as point B, indicates the time the system is considered to have reached a fully dark state. Thereafter, the system settles to its minimum transmittance 620. Upon the removal of voltage at point C, which may also include reversal of polarity or decreasing the amplitude of the voltage, the transmittance of the system increases. The time to increase transmittance by 85% of the optical contrast 630 (minimum transmittance 620 plus 85% of optical contrast 630, shown as 640), denoted as point D, indicates the time the system is considered to have reached a fully clear state. Thereafter, the system settles to maximum transmittance 650, exhibited by the system during an electrochromic switching cycle.

When the electrical potential or voltage is applied between the cathode and anode, the electrochromic cell can transition to a fully darkened state, for instance from maximum transmittance to a fully darkened state, in from 0.1 to 30 minutes, such as from 1 to 30 seconds, 5 to 30 seconds, from 10 to 25 seconds, and 15 to 25 seconds. When the electrical potential or voltage is reduced, removed or reversed, the electrochromic cell can transition to a fully clear state, for instance from minimum transmittance to a fully cleared state, in from 0.1 seconds to 60 minutes, such as from 0.1 to 30 minutes, 0.5 to 60 seconds, from 0.1 to 10 seconds, and from 0.1 to 1 seconds, measured using a spectrophotometer or a Hunter UltraScan PRO at visible spectrum wavelengths between 380 nm and 780 nm at 25° C. The time to transition from the fully clear state to the fully darkened state at a given voltage can depend on the construction of the electrochromic cell, as nonlimiting examples, the thickness of the coating and the lateral dimensions of the electrochromic cell.

Constructing an electrochromic cell as described above allows the coating thickness of the coating layer that includes the electrochromic gel to control the gap between the first and second optical substrates.

When only a first optical substrate is used, interdigitated electrodes can provide a voltage between the electrodes in the open gap and apply the voltage to the electrochromic gel coating layer. A second optical substrate can optionally be used if the electrochromic gel coating layer needs to be protected.

An advantage of the electrochromic cell as described above is that it eliminates pillowing. Pillowing occurs when the hydrostatic pressure in conventionally constructed electrochromic cells pushes out the center portion of a cell when it is filled/placed in an upright position. Conventionally constructed electrochromic cells are typically filled horizontally or require fixturing to prevent pillowing.

The electrochromic cells described herein can be used to make or be used as a component in electrochromic devices. As described above, the electrochromic device includes a first optical substrate, a first conductor, a second conductor not in direct contact with the first conductor, a coating layer that includes an electrochromic gel disposed over and in contact with the first conductor and the second conductor, optionally a second optical substrate, and a power source connected to the first conductor and the second conductor. One of the first conductor and the second conductor acts as a cathode and another electrode acts as an anode. Either or both of the first or second optical substrates can be optically clear substrates.

The electrochromic device can be a component of a viewing device. Nonlimiting examples of viewing devices according to this disclosure include windows, video display devices, virtual reality devices, smart eyewear, electrochromic eyewear, mirrors, batteries, augmented reality devices, extended reality devices, mixed reality devices, fixed displays, mobile communication devices, privacy screens, cameras, hiding displays, heads of display and automotive side panels.

Figure 2:
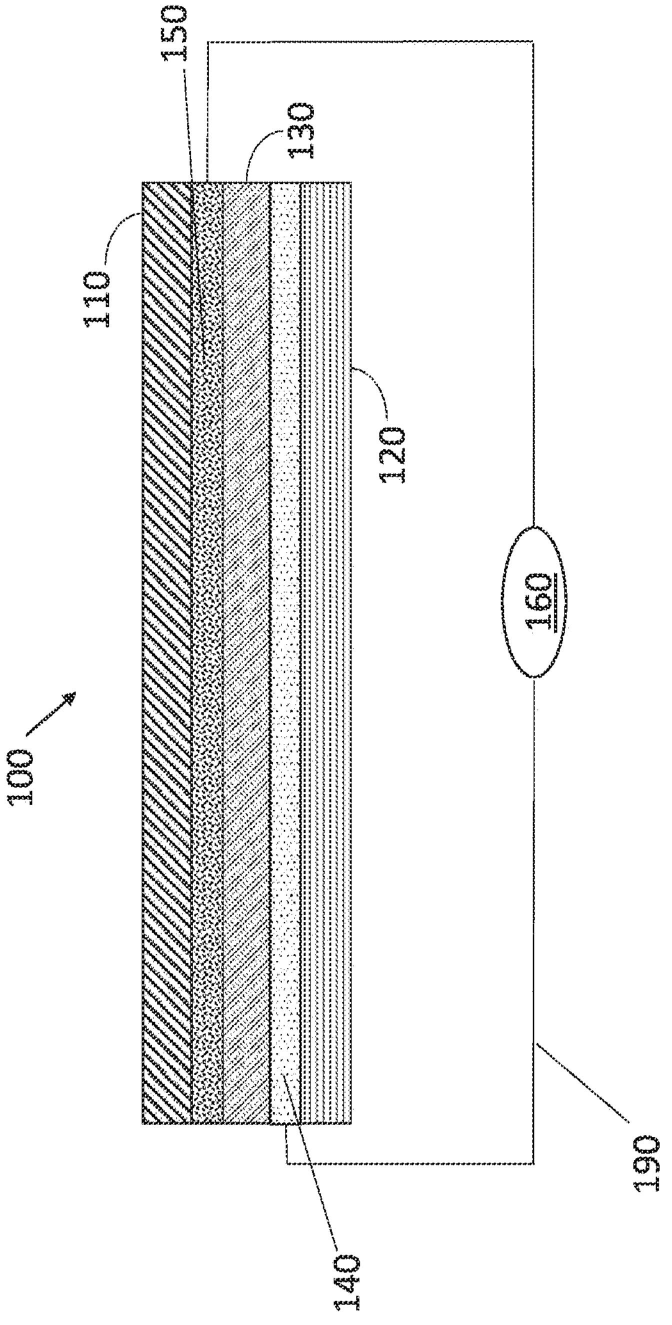
FIG. 2 is a nonlimiting example of an electrochromic device according to the disclosure, not drawn to scale.

FIG. 2 is a nonlimiting example of an electrochromic device according to the disclosure, not drawn to scale. Electrochromic device 100 includes first optical substrate 120 as described above, first conductor 150 and second conductor 140 as described above, a coating layer 130 that includes an electrochromic gel as described above and second optical substrate 110 as described above. Power source 160 is connected to first conductor 150 and second conductor 140 by wire 190.

Figure 3:
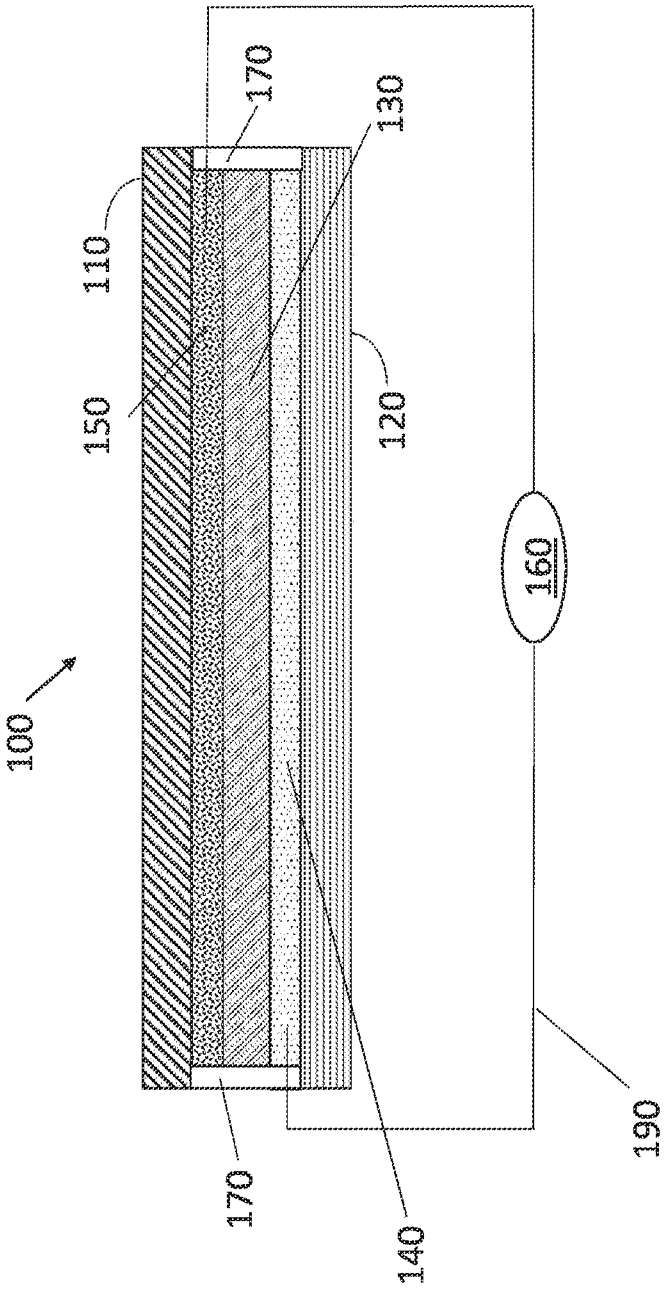
FIG. 3 is a nonlimiting example of an electrochromic device according to the disclosure, not drawn to scale.

FIG. 3 is a nonlimiting example of an electrochromic device according to the disclosure, not drawn to scale. Electrochromic device 100 includes first optical substrate 120 as described above, first conductor 150 and second conductor 140 as described above, a coating layer 130 that includes an electrochromic gel as described above and second optical substrate 110 as described above. Sealant 170 is disposed at the edges of electrochromic device 100 between first optical substrate 120 and second optical substrate 110. Power source 160 is connected to first conductor 150 and second conductor 140 by wire 190.

Figure 4:
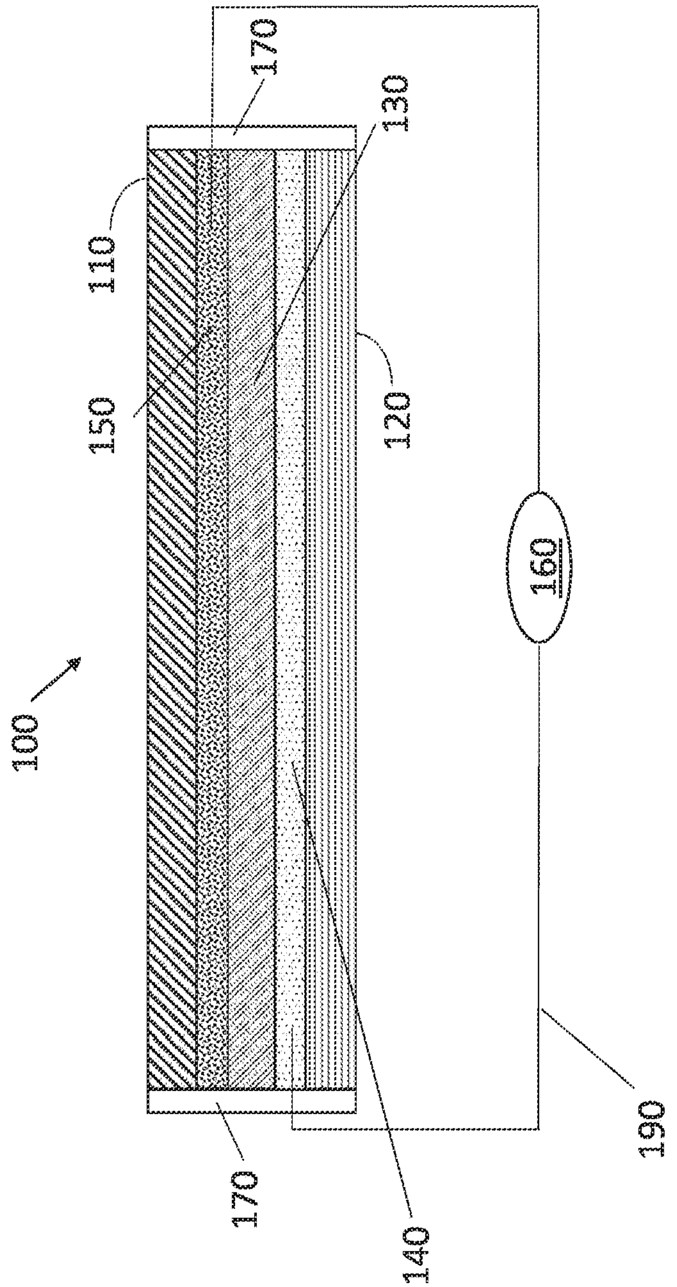
FIG. 4 is a nonlimiting example of an electrochromic device according to the disclosure, not drawn to scale.

FIG. 4 is a nonlimiting example of an electrochromic device according to the disclosure, not drawn to scale. Electrochromic device 100 includes first optical substrate 120 as described above, first conductor 150 and second conductor 140 as described above, a coating layer 130 that includes an electrochromic gel as described above and second optical substrate 110 as described above. Sealant 170 is disposed at the edges of electrochromic device 100 encompassing all layers from first optical substrate 120 to second optical substrate 110. Power source 160 is connected to first conductor 150 and second conductor 140 by wire 190.

Figure 5:
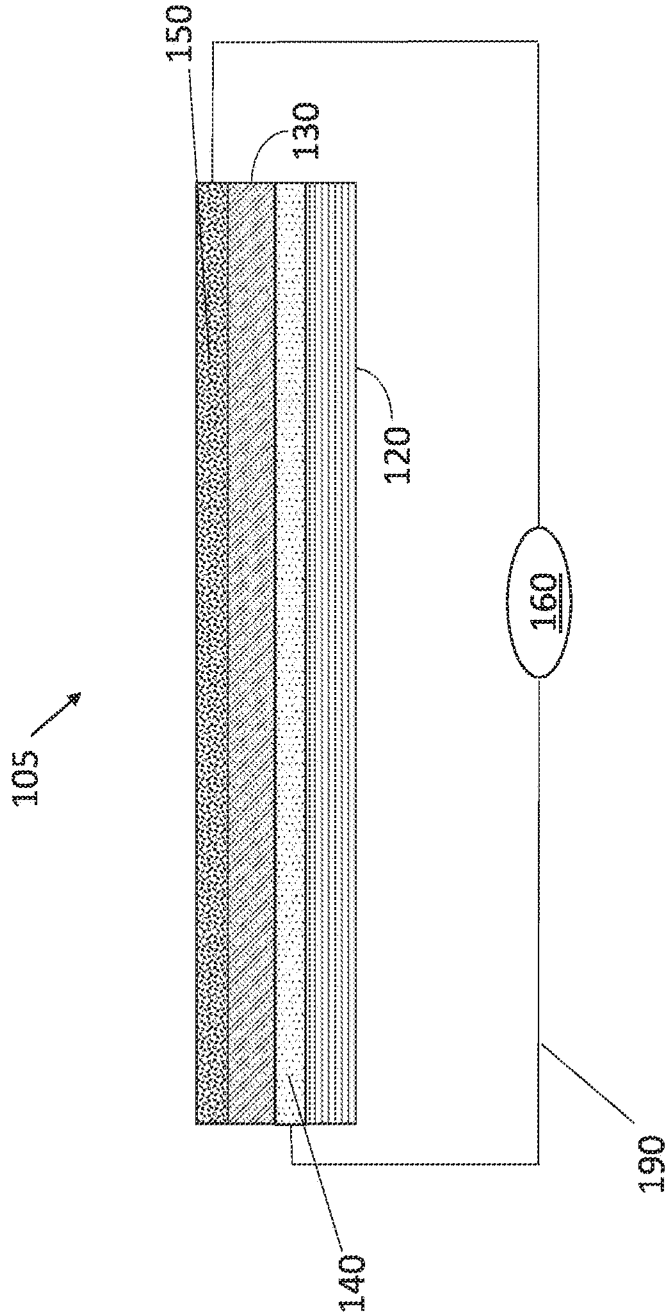
FIG. 5 is a nonlimiting example of an electrochromic device according to the disclosure, not drawn to scale.

FIG. 5 is a nonlimiting example of an electrochromic device according to the disclosure, not drawn to scale. Electrochromic device 105 includes first optical substrate 120 as described above, first conductor 150 and second conductor 140 as described above, and a coating layer 130 that includes an electrochromic gel as described above. Power source 160 is connected to first conductor 150 and second conductor 140 by wire 190.

Figure 6:
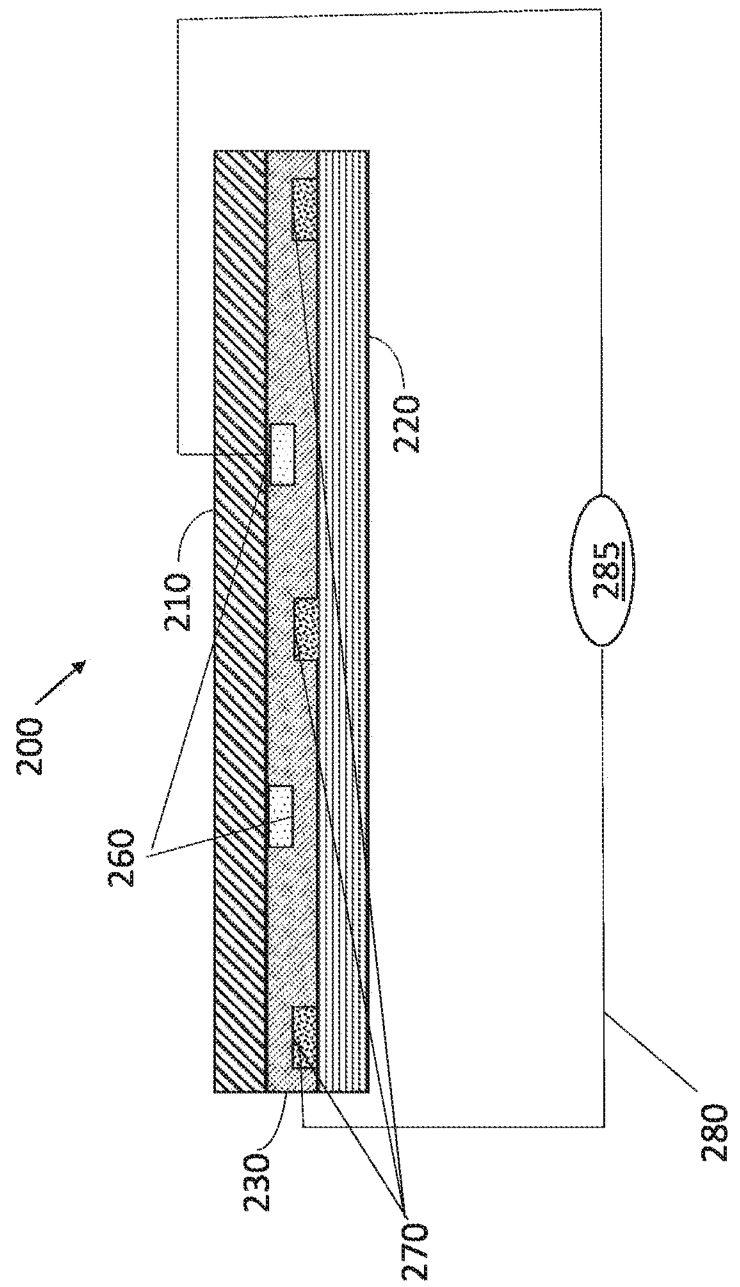
FIG. 6 is a nonlimiting example of an electrochromic device according to the disclosure, not drawn to scale.

FIG. 6 is a nonlimiting example of an electrochromic device according to the disclosure, not drawn to scale. Electrochromic device 200 includes first optical substrate 220 as described above, first conductor 270 and second conductor 260 as described above, a coating layer 230 that includes an electrochromic gel as described above and second optical substrate 210 as described above. Power source 285 is connected to first conductor 270 and second conductor 260 by wire 280.

Figure 7:
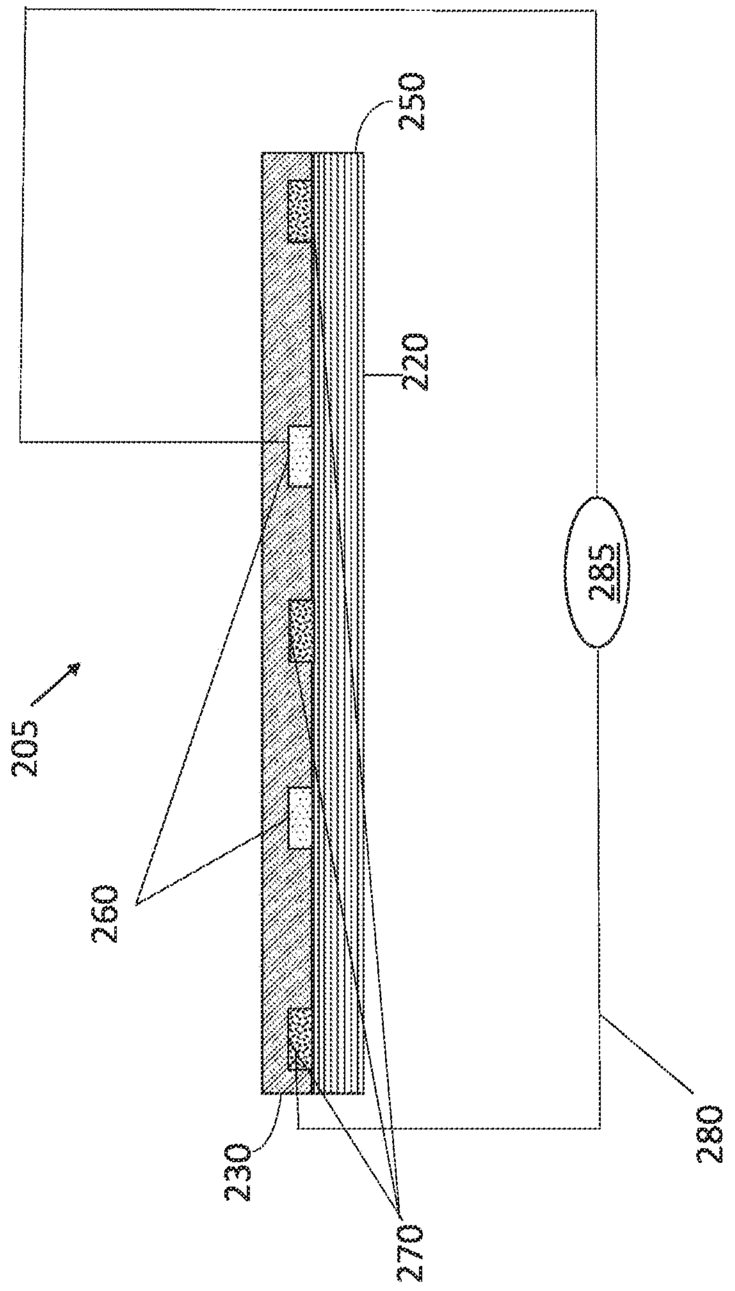
FIG. 7 is a nonlimiting example of an electrochromic device according to the disclosure, not drawn to scale.

FIG. 7 is a nonlimiting example of an electrochromic device according to the disclosure, not drawn to scale. Electrochromic device 205 includes first optical substrate 220 as described above, first conductor 270 and second conductor 260 as described above, a coating layer 230 that includes an electrochromic gel as described above. Power source 285 is connected to first conductor 270 and second conductor 260 by wire 280.

Figure 8:
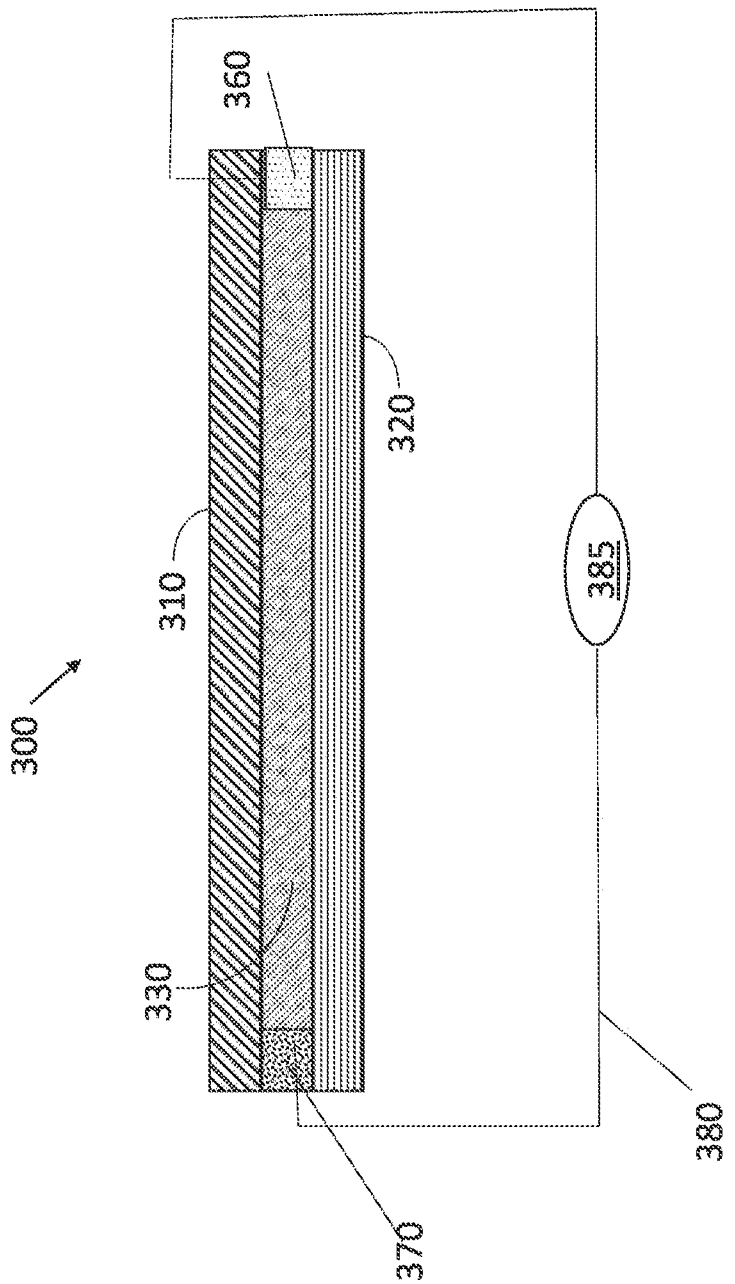
FIG. 8 is a nonlimiting example of an electrochromic device according to the disclosure, not drawn to scale.

FIG. 8 is a nonlimiting example of an electrochromic device according to the disclosure, not drawn to scale. Electrochromic device 300 includes first optical substrate 320 as described above, first conductor 370 and second conductor 360 as described above, a coating layer 330 that includes an electrochromic gel as described above and second optical substrate 310 as described above. Power source 385 is connected to first conductor 370 and second conductor 360 by wire 380.

EXAMPLES

Example 1: Preparation of Electrochromic Solutions

Comparative Example CE-1. Crosslinkable Electrochromic Composition

According to the quantities in Table 1, the components of Charge 1 were combined and stirred at ambient temperature for 5 minutes, until the solution was homogeneous. The polyester polyols of Charge 2 were added and stirred at ambient temperature for 5 minutes, at which time a hazy green solution was achieved. To this was added Charge 3 with stirring, the solution was capped and stirred overnight at ambient temperature before use. The resulting solution was a liquid and demonstrated Newtonian behavior.

TABLE 1

Crosslinkable electrochromic composition

| | Component | CE-1 (parts by weight) |
|---|---|---|
| Charge 1 | Diheptyl Viologen | 2.04 |
| | Dimethyl Phenazine | 0.81 |
| | Propylene Carbonate | 61.98 |
| Charge 2 | STEPANOL ® PC-1011-45[1] | 5.00 |
| | DESMOPHEN ® 1915U[2] | 5.00 |
| Charge 3 | DESMODUR ® N-3300A[3] | 1.44 |

[1]A polyether polyol available from Stepan Company.
[2]A polyester polyol available from Covestro.
[3]An aliphatic polyisocyanate available from Covestro.

Examples 2 and 3

According to the amounts in Table 2, the ingredients of Charge 1 were combined and stirred for 5 minutes until fully dissolved at ambient conditions. The components of Charge 2 were combined in a separate vessel and heated to 90° C. with stirring until the solution was homogeneous.

The solution of Charge 1 was added to the hot solution of Charge 2 with mixing until a green homogeneous solution was formed. This solution was allowed to cool to ambient conditions to form a thermoreversible electrochromic gel.

TABLE 2

Thermoreversible electrochromic gel formulations. Values are weights in grams.

| | | Example 2 | Example 3 |
|---|---|---|---|
| Charge 1 | Diheptyl Viologen | 0.58 | 0.28 |
| | Di-isopropyl Phenazine | 0.23 | 0.11 |
| | Propylene Carbonate | 4.22 | 4.30 |
| Charge 2 | PVDF co-HFP[4] | 0.75 | 1.00 |
| | Propylene Carbonate | 4.22 | 4.30 |

[4]Poly(vinylidene fluoride-co-hexafluoropropylene) pellets purchased from Sigma-Aldrich.

Part 2: Characterization of Thermoreversible Gel of Example 3

The gel of Example 3, starting at ambient conditions, was characterized using an Anton Paar MCR 302 rheometer with a cone and plate configuration having a 25 mm diameter and 1 degree cone angle equipped with RheoCompass software.

Figure 9:
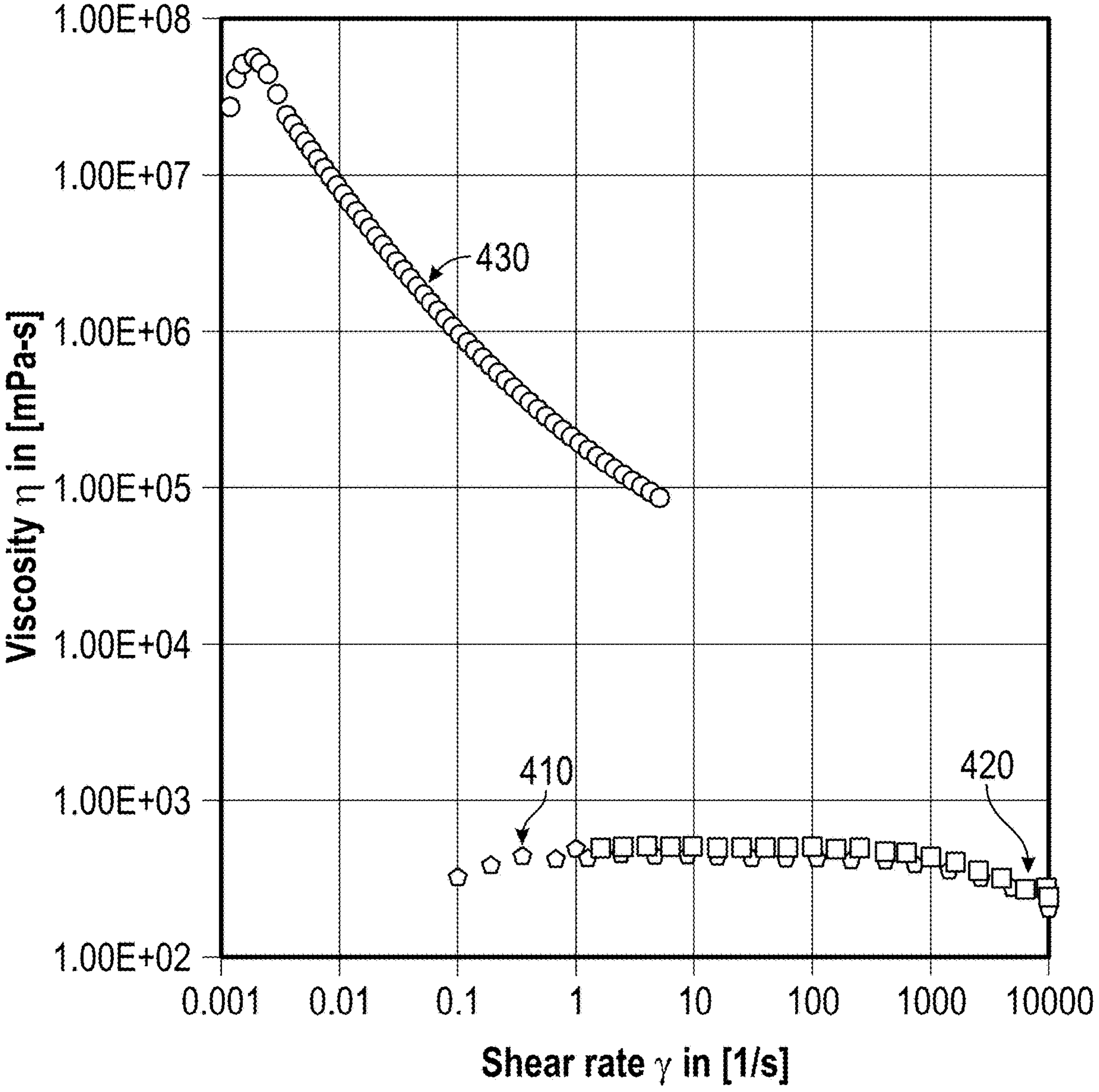
FIG. 9 is a graph of viscosity versus shear rate according to the disclosure.

FIG. 9 is a graph of viscosity (mPa*s) vs. shear rate ($s^{-1}$) demonstrating the shear thinning behavior of the electrochromic gel at 25° C. (shown as 430) and 90° C. (shown as 410 and 420). At 25° C., the electrochromic gel exhibits a yield point of about $5\times10^7$ mPa*s at about 0.002 $s^{-1}$. The viscosity decreases to a viscosity of about 100 mPa*s at about 8 $s^{-1}$. From about 0.01 $s^{-1}$ to about 1 $s^{-1}$, the slope of the curve is about 3 mPa*$s^2$. At 90° C., the electrochromic gel demonstrates different behavior. At 90° C., the In viscosity (mPa*s) vs. shear rate ($s^{-1}$) curve is relatively flat ranging from about 0.2 to 0.4 mPa*s, ranging from about −0.5 to 0.5 mPa-$s^2$ at 90° C. at about 0.1 $s^{-1}$ to about 1,000 $s^{-1}$.

Figure 10:
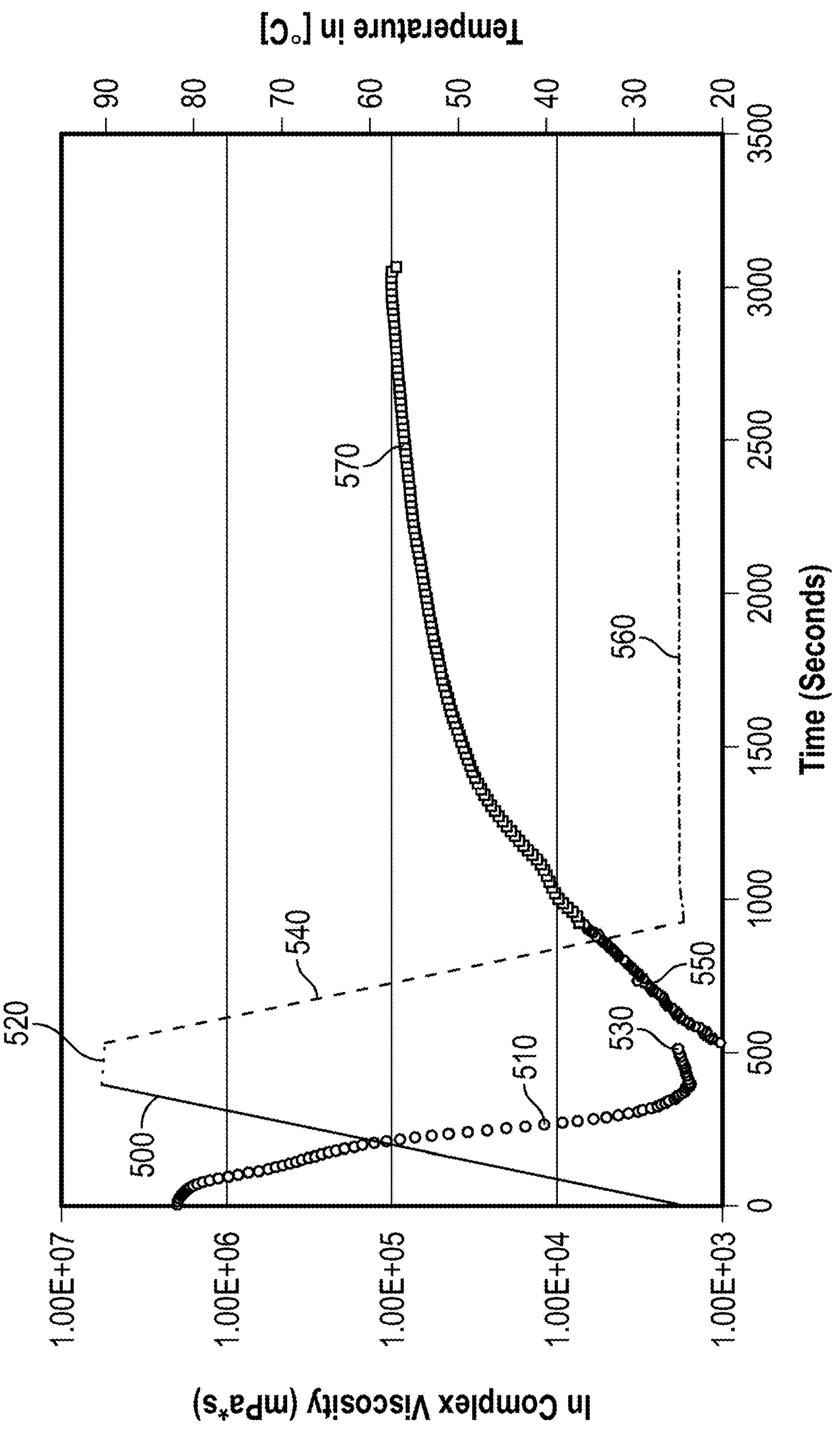
FIG. 10 is a graph showing the relationship between complex viscosity and temperature versus time according to the disclosure.

FIG. 10 is a graph, ln complex viscosity (mPa*s) (measured at 1% shear strain and 10 rad/s frequency) on one y axis and temperature (° C.) on the other y axis vs. time (minutes) demonstrating the temperature dependent complex viscosity behavior of the electrochromic gel at from 25° C. to 90° C. When the ambient electrochromic gel is initially evaluated it exhibits a viscosity of about $2\times10^6$ mPa*s at 25° C., which decreases to about 1700 mPa*s at 90° C. over about 6 minutes (shown as 510 for complex viscosity and 500 for time). The slope of the decrease is about −115,000 mPa*s/° C. from about 60 to about 75° C. The electrochromic gel recovers viscosity (shown as 530) as the temperature is decreased beginning at about 1000 mPa*s at 90° C. (after sitting under those conditions for about 2 minutes, 520) and increases to about 7,000 mPa*s at 25° C. (shown as 550) over about 6 minutes (shown as 540). The slope of the recovery is about 1,000 mPa*s/° C. from about 80 to about 35° C. The viscosity continues to recover over time to about 100,000 mPa*s (shown as 570) after about 35 minutes (shown as 560) at 25° C. The slope of the recovery at 25° C. is about 2,500 mPa*s/minute from about 15 minutes after reaching 25° C. to about 35 minutes after reaching 25° C.

Part 3: Assembly of Electrochromic Cells

Comparative Example CE-1A

Two Indium Tin Oxide (ITO) coated glass substrates having dimensions of 50×70×1.1 mm, and a surface resistivity of about 3 Ω/sq (obtained from Delta Technologies Limited) were assembled with the coated sides facing one another, and a PTFE spacer sandwiched between the glass substrates to set the thickness at 400 μm. A two-part epoxy sealant was applied and cured at 120° C. for 1 hour one edge at a time. Before sealing the final edge, the PTFE spacer was removed from between the glass. When sealing the final edge, a fill port was left that is about 0.5 inches long.

After fully curing all epoxy layers, the curable electrochromic solution of Example CE-1 was added to the cell through the fill port via a plastic pipette. Air bubbles were removed by applying vacuum. The filled cell assembly was heated at 85° C. for 2 hours to form a crosslinked electrochromic gel. The cell was then degassed 5 times under vacuum no lower than 67.7 kPa, then kept at 16.9 kPa overnight. The next day, the fill port was sealed with urethane adhesive (LORD® 7150A/B), which was cured at ambient conditions for 1 hour. Lead wires from the power supply were attached to the ITO coated sides of the glass substrates to create an electrochemical cell.

Examples 2A and 3A

For each of Examples 2A and 3A, a first ITO glass substrate as described in CE-1 was placed on an AFA-II automated draw down table from Henan Chuanghe Laboratory Equipment Co. Ltd., with the coated side up. For each cell assembly, the formulation of Example 2 or 3, respectively, was heated at 50° C. under ~100 rpm agitation for 10 minutes, then slot-die coated onto the ITO side of the first glass substrate to achieve the indicated thickness. The coated substrate remained at ambient temperature for one hour, at which time the thermoreversible gel had resolidified. The second glass substrate was placed over the thermoreversible gel coating with the ITO coated side toward the coating. Lead wires from the power supply were attached to the ITO coated sides of the glass substrates to create an electrochemical cell similar to what is depicted in FIG. 2.

Part 3: Performance Evaluation of Electrochromic Cells

After assembly, each electrochromic cell was evaluated for maximum transmittance range, transition time from fully dark (voltage applied) to fully clear (voltage removed), and haziness. The results are shown in Table 3. In these results, transmittance refers to the percentage of visible light at 555 nm frequency that passed through the sample. The measurements for CE-1A were made at 25° C. using a Color i7 spectrophotometer, manufactured by X-Rite. The measurements for Examples 2A and 3A were made at 25° C. using an UltraScan PRO spectrophotometer, manufactured by HunterLab.

TABLE 3

Optical and Switching Characteristics Comparison for Electrochromic cells

| | CE-1A | Example 2A | Example 3A |
|---|---|---|---|
| Activation Voltage (V) | 1.2 | 1.2 | 1.2 |
| AC/DC | DC | DC | DC |
| Sample Thickness (mil) | 16 | 1 | 4 |
| Clear-State Transmittance (% T) @555 nm | 55 | 76 | 87 |
| Dark-State Transmittance (% T) @555 nm | 0 | 2 | 5 |
| Optical Contrast (Δ % T) @555 nm | 55 | 74 | 82 |
| Clear-to-Dark Switching Speed (s) | Not measured | Not measured | 8 |
| Dark-to-Clear Switching Speed (s) | 21 | 15 | 25 |
| % Haze | 0 | 2.5 | 0.3 |

As shown in Table 3, the coated cells demonstrated fast switching speeds over a larger optical contrast than the corresponding crosslinked electrochromic system of CE-1A. In addition, the coatings of Examples 2 and 3 demonstrate higher contrast and higher transmittance at significantly lower thicknesses.

Whereas particular embodiments of this disclosure have been described above for purposes of illustration, it will be evident to those skilled in the art that numerous variations of the details of the present disclosure may be made without departing from the disclosure as defined in the appended claims.

We claim:

1. An electrochromic gel comprising:
- 20 to 99 wt. % of a polar solvent,
- 0.5 to 25 wt. % of a rheology modifying agent, and
- 0.5 to 20 wt. % of an electrochromic material;

wherein the rheology modifying agent dissolved in the polar solvent forms a thermoreversible gel; and wherein the thermoreversible gel is a gel at 25° C. and is a fluid at 120° C.

2. The electrochromic gel according to claim 1, wherein the polar solvent comprises $C_1$ to $C_6$ alkyl carbonates, $C_1$ to $C_6$ alkyl phosphates, acetone, methyl isobutyl ketone, methyl ethyl ketone, dimethyl formamide, $C_1$ to $C_6$ alcohols, water, formamide, and/or dimethyl sulfoxide.

3. The electrochromic gel according to claim 1, wherein the rheology modifying agent comprises poly(vinylidene fluoride), poly(vinylidene fluoride-co-hexafluoropropylene), poly(vinyl chloride), poly(vinyl alcohol), poly(methyl (meth)acrylate), poly(ethylene oxide), poly(vinyl pyrrolidone) and/or poly(propylene carbonate).

4. The electrochromic gel according to claim 1, wherein the electrochromic material comprises a cathodic electrochromic agent and an anodic electrochromic agent.

5. The electrochromic gel according to claim 1, wherein the cathodic electrochromic agent comprises viologen and its derivatives, and the anodic electrochromic agent comprises phenazine, phenazine derivatives, and/or N,N,N',N'-tetramethyl-p-phenylenediamine.

6. A method of making the electrochromic gel according to claim 1 comprising
- combining the electrochromic material and a portion of the polar solvent by mixing under ambient conditions to form an electrochromic material solution,
- combining the rheology modifying agent and a portion of the polar solvent by mixing at a temperature of from 30° C. to 120° C. to form a rheology modifying agent solution,
- combining the electrochromic material solution and the rheology modifying agent solution and allowing the combined solution to cool to ambient conditions to form the electrochromic gel; or
- applying a first conductor over at least a portion of a first optical substrate,
- applying a second conductor over at least a portion of the first optical substrate such that the second conductor is not in direct contact with the first conductor, and
- applying a coating layer comprising an electrochromic gel according to claim 1 over at least a portion of the first optical substrate and optionally over at least a portion of a second optical substrate, wherein the coating layer is in contact with the first conductor and the second conductor; or
- applying a first conductor over at least a portion of a first optical substrate,
- applying a coating layer comprising an electrochromic gel according to claim 1 over at least a portion of the first optical substrate and in contact with the first conductor,
- optionally applying a coating layer comprising an electrochromic gel according to claim 1 over at least a portion of a second optical substrate,
- applying a second conductor over at least a portion of the second optical substrate, and
- applying the second optical substrate over the first optical substrate, first conductor, and electrochromic gel, such that the second conductor is not in direct contact with the first conductor.

7. The method of making an electrochromic cell according to claim 1 comprising applying a second optical substrate over the first conductor, the second conductor and electrochromic gel.

8. The method according to claim 6, wherein the first and second optical substrates are optically clear substrates and the first optically clear substrate and the second optically clear substrate each independently comprise glass, flexible polymeric materials and rigid polymeric materials selected from poly (methyl methacrylate), polycarbonate, polyethylene terephthalate, poly (allyl diglycol carbonate), polyurea, polyurethane, polythiourea, and/or polythiourethane; and/or
- wherein one or both of the first conductor and second conductor are independently transparent conductors; and/or
- wherein the first conductor and second conductor independently comprise indium tin oxide, fluorine-doped tin oxide, partially octadecyltrichlorsilane covered indium tin oxide, metal mesh, silver nanowires, aluminium doped zinc oxide (AZO), carbon nanotubes, graphene and/or conductive polymers; and/or
- wherein the coating layer comprising an electrochromic gel is applied using a method comprising draw down, screen printing, spin coating, spray application, cut and stick, extrusion, casting, ink jet, gravure, and/or roll to roll.

9. The method according to claim 1, wherein the coating layer has a thickness of from 0.1 to 12 mil; and wherein the thickness of the coating layer that includes the electrochromic gel controls the space between the first substrate and second substrates.

10. The method according to claim 6, wherein the visible light transmittance through the electrochromic cell in the clear state is from 50% to 99% measured using a Hunter UltraScan PRO at visible spectrum wavelengths between 380 nm and 780 nm.

11. The method according to claim 6, wherein the visible light transmittance through the electrochromic cell in the dark state is from 0.00001 to 50%, measured according to ASTM E972 at visible spectrum wavelengths between 380 nm and 780 nm; and/or wherein the haze in the electrochromic cell in the clear state is from 0.05% to 10% measured using a spectrophotometer or Hunter UltraScan PRO at visible spectrum wavelengths between 380 nm and 780 nm at 25° C.

12. The method according to claim 6, wherein the electrochromic cell transitions to a fully darkened state, upon application of a voltage, in from 0.1 seconds to 30 minutes measured using a spectrophotometer or Hunter UltraScan PRO at visible spectrum wavelengths between 380 nm and 780 nm at 25° C.

13. An electrochromic device comprising the cell made according to a method according to claim 6, wherein the electrochromic cell transitions to a fully clear state, upon reduction and/or removal and/or reversal of a voltage, in from 0.1 seconds to 60 minutes, measured using a spectrophotometer or a Hunter UltraScan PRO at visible spectrum wavelengths between 380 nm and 780 nm at 25° C.

14. The electrochromic device according to claim 13 comprising a first optical substrate comprising, a first conductor, a second conductor not in direct contact with the first conductor, and a coating layer comprising an electrochromic gel disposed over and in contact with the first conductor and the second conductor; and a power source;

and optionally a second optical substrate wherein the first and/or second optical substrates are optically clear substrates.

15. The electrochromic device according to claim 14, wherein the first optical substrate and the second optical substrate comprise glass, flexible polymeric materials and rigid polymeric materials, poly (methyl methacrylate), polycarbonate, polyethylene terephthalate, poly (allyl diglycol carbonate), polyurea, polyurethane, poly-thiourea, and/or poly-thiouethane;

wherein one or both of the first conductor and second conductor are transparent conductors.

16. The electrochromic device according to claim 14, wherein the first conductor and second conductor comprise indium tin oxide, partially octadecyltrichlorsilane covered indium tin oxide, metal mesh, silver nanowires, gold nanowires, and/or conductive polymers.

17. The electrochromic device according to claim 14, wherein the coating layer comprising an electrochromic gel is applied using a method comprising draw down, slot-die, screen printing, spin coating, spray application, cut and stick, extrusion, casting, ink jet, gravure, and/or roll to roll.

18. The electrochromic device according to claim 14, wherein the electrochromic device is a A viewing device.

19. The electrochromic device according to claim 18, wherein the viewing device comprises windows, video display devices, virtual reality devices, smart eyewear, electrochromic eyewear, mirrors, batteries, augmented reality devices, extended reality devices, mixed reality devices, fixed displays, mobile communication devices, privacy screens, cameras, hiding displays, heads of display and/or automotive side panels.

* * * * *